United States Patent
Sears et al.

(10) Patent No.: US 7,204,481 B2
(45) Date of Patent: Apr. 17, 2007

(54) MAGNETORHEOLOGICAL RECONFIGURABLE CLAMP FOR A FLEXIBLE MANUFACTURING SYSTEM

(75) Inventors: Ivan G. Sears, Rochester Hills, MI (US); Robin Stevenson, Bloomfield, MI (US); Roland J. Menassa, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 130 days.

(21) Appl. No.: 11/145,418

(22) Filed: Jun. 3, 2005

(65) Prior Publication Data

US 2005/0269758 A1    Dec. 8, 2005

Related U.S. Application Data

(60) Provisional application No. 60/576,923, filed on Jun. 4, 2004.

(51) Int. Cl.
*B25B 5/16*    (2006.01)
(52) U.S. Cl. .......................................... 269/266; 269/8
(58) Field of Classification Search ................ 269/266, 269/8, 903, 289 R, 20
See application file for complete search history.

(56) References Cited

U.S. PATENT DOCUMENTS

| 5,005,814 | A | * | 4/1991 | Gumbert | 269/309 |
| 5,206,627 | A | * | 4/1993 | Kato | 340/674 |
| 5,897,108 | A | * | 4/1999 | Gordon et al. | 269/50 |
| 6,644,637 | B1 | | 11/2003 | Shen et al. | 269/152 |
| 6,711,796 | B2 | * | 3/2004 | Su | 29/281.1 |
| 2005/0269758 | A1 | * | 12/2005 | Sears et al. | 269/266 |

* cited by examiner

*Primary Examiner*—Lee D. Wilson
(74) *Attorney, Agent, or Firm*—Kathryn A. Marra

(57) ABSTRACT

A reconfigurable clamp for a flexible manufacturing system comprises a body portion, a plurality of pins slidably engaged within sleeves formed in the body portion, a compression spring attached to each shaft of the plurality of pins, a reservoir comprising a magnetorheological fluid in operative communication with the plurality of pins, and an electromagnet in operative communication with the magnetorheological fluid, wherein the electromagnet selectively increases a yield stress property of the magnetorheological fluid; and a matching pressure foot.

20 Claims, 6 Drawing Sheets

MAGNETORHEOLOGICAL RECONFIGURABLE CLAMP FOR A FLEXIBLE MANUFACTURING SYSTEM

CROSS REFERENCE TO RELATED APPLICATIONS

This application relates to, and claims priority to, provisional U.S. Application No. 60/576,923 filed on Jun. 4, 2004, hereby incorporated by reference in its entirety.

BACKGROUND

The present disclosure generally relates to a flexible manufacturing system for vehicle assembly, and more particularly, to a magnetorheological reconfigurable clamp for providing support for a variety of different body panel configurations employed in the vehicle assembly without requiring manual adjustment or reprogramming.

The advent of assembly lines has enabled rapid, mass production of products at a reduced product cost. Assembly lines typically include multiple operation stages with component, material or sub-assembly inputs. Sometimes the workpieces are similar or related part shapes. Other times, the workpieces are of unrelated design but require similar manufacturing operations. In these varied applications, the fixture reconfiguration or changeover from one part design to another has to be fast enough to meet the productivity requirements of current manufacturing systems.

Previous efforts in designing and developing flexible fixturing for either small batch manufacture or mass production scenarios can generally include the use of modular fixtures and conformable fixtures. Modular fixturing generally includes fixtures assembled from a standard library of elements such as V-blocks, toggle clamps, locating blocks, and the like. Their flexibility lies in the ability to be reconfigured either manually or by a robotic device. However, modular fixtures have no intrinsic ability to adapt to different sizes and shapes of parts within a part family. In addition, the time necessary for reconfiguration is long and modular fixtures generally lack stiffness. As a result, modular fixtures are more suited to a job shop environment rather than mass production.

The advent of Flexible Manufacturing Systems (FMS) in the early 1960's provided the impetus for work on conformable fixturing. A conformable fixture is defined as one that can be configured to accept parts of varying shape and size. Conformable fixture technology generally includes encapsulant or mechanistic techniques. Examples of encapsulant fixtures are found in the aerospace industry, where low melting-point metals are used to enclose turbine blades and produce well-defined surfaces for part location and clamping for grinding operations. While an excellent means of facilitating the holding of complex parts, encapsulation is a costly and time-consuming process.

Mechanistic fixtures reported in the literature include the use of petal collets, programmable conformable clamps, a programmable/multi-leaf vise, an adjustable integral fixture pallet, and the like. Of these, the adjustable integral fixture pallet concept appears to be the most capable of accommodating a part family of castings. To date, however no feasibility studies have been conducted regarding the applicability of any of these techniques to production machining operations.

One troublesome area in flexible manufacturing systems is its implementation in body shops. Clamps are typically employed to support the various sheet metal workpieces, e.g., body panels, during assembly and clamping can potentially scratch the exposed surface and/or locally deform the workpiece, affecting its aesthetic quality. While, ideally, clamping could be performed on flanges or surfaces that are invisible or immaterial to end users, some clamping inevitably occurs on exposed surfaces.

Current clamps utilized in assembly lines generally include a clamp block, which accurately matches the contours of the workpiece and a matching pressure foot. In operation, the clamp block supports the exterior surface of the workpiece while the pressure foot contacts the inner (non-exposed) surface with a compliant pad shaped to approximate, in the unloaded condition, a point. With this approach, minor differences between the shape of the workpiece and the clamp block geometry can be accommodated without introducing local deformation. As a result, the contour of each clamp block is generally specific to a limited number of work pieces and surfaces. In dedicated facilities, the contours of the clamp block are generally fabricated by numerically controlled (NC) machining using data generated from the workpiece to be fixtured. A problem arises if multiple models are produced having significantly different workpiece configurations. Multiple clamp blocks having different contours are then required to accommodate the multiplicity of workpiece configurations.

Accordingly, there remains a need for a reconfigurable clamp block that can provide adequate support for a variety of workpiece configurations.

BRIEF SUMMARY

Disclosed herein are a reconfigurable clamp, a system, and a process of use. In one embodiment, the reconfigurable clamp comprises a body comprising a plurality of sleeves and a reservoir in fluid communication with the sleeve; a plurality of pins, wherein each one of the plurality of pins is disposed in sliding engagement with a corresponding one of the plurality of sleeves, wherein each one the plurality of pins comprises a head, a shaft extending from the head, and a compression spring in operative communication with the shaft; a magnetorheological fluid disposed in the reservoir and the plurality of sleeves; and an electromagnet in operative communication with the magnetorheological fluid.

In another embodiment, a reconfigurable clamp system, comprises a clamp comprising a body portion, a plurality of pins slidably engaged within sleeves formed in the body portion, a compression spring attached to each shaft of the plurality of pins, a reservoir comprising a magnetorheological fluid in operative communication with the plurality of pins, and an electromagnet in operative communication with the magnetorheological fluid, wherein the electromagnet selectively increases a yield stress of the magnetorheological fluid; and a matching pressure foot.

In another embodiment, a process for clamping a workpiece comprises loading a first workpiece onto a reconfigurable clamp, wherein the reconfigurable clamp comprises a clamp comprising a body portion, a plurality of pins slidably engaged within sleeves formed in the body portion, a compression spring attached to each shaft of the plurality of pins, a reservoir comprising a magnetorheological fluid in operative communication with the plurality of pins, and an electromagnet in operative communication with the magnetorheological fluid, wherein the electromagnet selectively increases a yield stress of the magnetorheological fluid; compressing the plurality of pins to conform substantially to a surface contour of the first workpiece; applying a magnetic field with the electromagnet to the magnetorheological fluid to alter a shear force of a sliding engagement between the plurality of pins and the sleeves; and applying a member to a backside of the first workpiece.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Disclosed herein is a magnetorheological reconfigurable clamp system for providing support and securement of a variety of dissimilar workpieces. Although reference will be made to its use in fixturing automotive body panels, it should be understood that the magnetorheological reconfigurable clamp system could be employed for a variety of end use applications where it may be desirable to support dissimilar workpieces without requiring manual adjustment or reprogramming. For example, the magnetorheological reconfigurable clamp system can be employed in flexible manufacturing systems for thin walled and/or thick walled objects, contoured and/or planar objects, on exterior surfaces as well as on hidden surfaces, and the like. Advantageously, the magnetorheological reconfigurable clamp system can be used on exposed surfaces of body panels without marring, scratching and/or causing local deformations.

The following description of the preferred embodiments is merely exemplary in nature and is in no way intended to limit the disclosure, its application, or uses.

Figure 1:
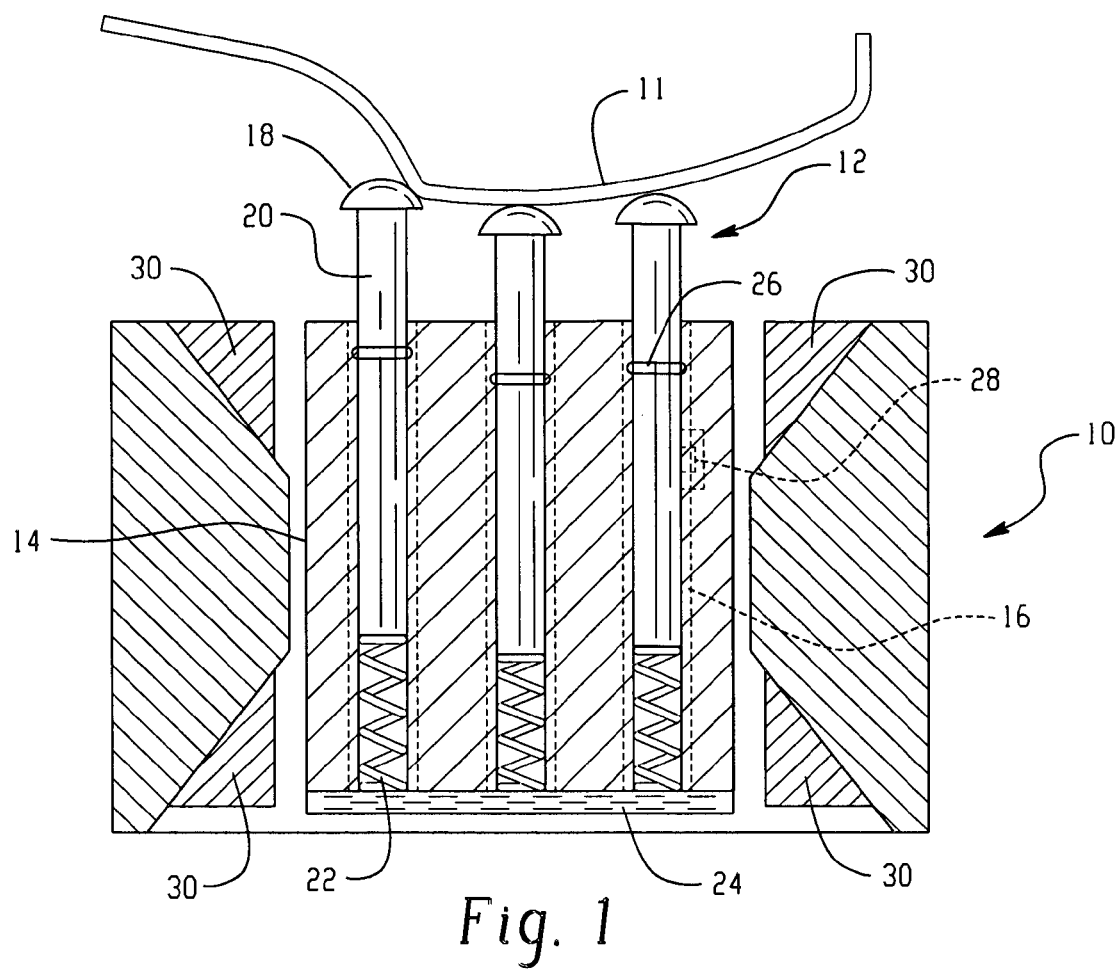
FIG. 1 is cross sectional view of a magnetorheological reconfigurable clamp block.
Figure 2:
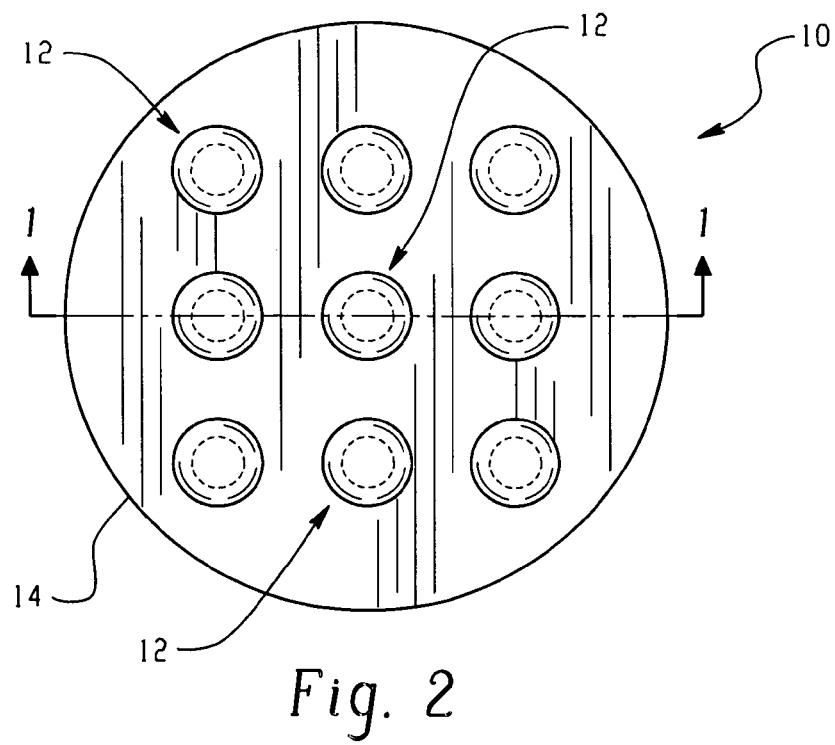
FIG. 2 is a top view of the magnetorheological reconfigurable clamp block of FIG. 1.

Referring now to FIGS. 1 and 2, there is shown an exemplary magnetorheological reconfigurable clamp, generally designated by reference numeral 10, which is suitable for use in a flexible manufacturing system, for example. As will be described in greater detail below, the flexible manufacturing system generally includes a matching pressure foot (see FIGS. 3–7) in addition to the magnetorheological reconfigurable clamp 10 for clamping workpieces 11 during manufacturing. The system, utilizing the magnetorheological reconfigurable clamp described herein, can be employed to accommodate a variety of product types as compared to prior art systems. In this manner, significant savings can be obtained by reducing design, engineering, manufacturing, and purchasing of clamp blocks for each product type, e.g., dissimilar body panels.

The magnetorheological reconfigurable clamp block 10 generally includes an adjustable contact portion, which eliminates the need for manual adjustment and reprogramming during changeovers. The adjustable contact portion includes a plurality of spring-loaded pins 12 mounted within a body 14 for contacting the workpiece 11. As shown, there are nine spring-loaded pins 12. Although the body 14 is illustrated as cylindrical and as having a block shape, other shapes are contemplated. Moreover, the disclosure is not intended to be limited to the nine pins. More or fewer pins can be employed depending on the desired application. Likewise, the spatial arrangement between the pins within the cylindrical body is not intended to be limiting.

Each pin 12 is independently vertically adjustable and is disposed in cylindrically shaped sleeves 16 within the body 14. The sleeves 16 are dimensioned to permit vertical motion of the pins 12, yet restrain or minimize lateral motion. Each pin 12 includes a head 18 and a shaft 20 extending vertically from the head 18. The head 18 is illustrated as having a generally convex surface and as will be described in greater detail below, is the point of contact between the clamp block and the workpiece to be supported and/or clamped. A compression spring 22 is in operative communication with the shaft 20 and the body 14 to provide vertical motion to the pin upon application of a displacement or of a force upon the pin, assuming, of course, that the pin is not in a locked position. The load strength of the compression springs 22 is optimized for the various workpieces the system is intended to handle. A sealed region 24 intermediate the shaft 20 and a lower portion of the body 14 is filled with a magnetorheological fluid. The region is pressurized during use to permit movement of the fluid into and out of the sleeves 16.

Each pin 12 further includes an o-ring seal 26 in sealing contact with the shaft 20. Optionally, in addition to or in place of the o-ring seal, the sealed region 24 may comprise a pressurized bladder, wherein the bladder is filled with the magnetorheological fluid. The bladder (not shown) can include a plurality of extendable fingers adapted to fit the contours of the sleeve in fluid communication with a main reservoir. The compression spring 22 would then seat on the extendable finger of the bladder.

Optionally, stops 28 may be provided along the shaft 20 of each pin 12 to prevent unrestrained retraction or extension of the spring-loaded pins 12. In this embodiment, the sleeve 16 would include a recessed portion to accommodate the stop 28, wherein the vertical length dimension of the recessed portion defines the extent of vertical movement. The stop is not intended to be limited to any particular stop mechanism. By way of example, the stop may comprise a protrusion outwardly extending from the pin shaft into the recessed portion of the body 14, wherein the recessed portion has a defined upper and lower ceiling that operatively communicates and interacts with the protrusion.

The pins 12 are fabricated from a material suitable to support the workpiece. Optionally, the pinheads 18 are coated with a low durometer material such as a polymer. Suitable polymers include thermoplastic resins and thermoset resins. Non-limiting examples include polyurethanes, among others. In one embodiment, a sheet of the low durometer material is draped or disposed over the pins. In this embodiment, the thickness of the sheet can be defined by the spacing between adjacent pinheads, wherein the thickness is slightly less than the spacing. In other embodiments, the pins 12 are individually covered and/or coated with the low durometer material.

The body 14 further includes an electromagnet 30 disposed about the sealed region 24 and sleeves 16 such that a substantially uniform magnetic field can be selectively generated and applied to the magnetorheological fluid, which during operation occupies a portion of the sleeve as well as the reservoir. The electromagnet 30 is in electrical communication with a power source (not shown). For example, as shown, one or more coils are disposed proximate to the magnetorheological fluid.

Because the pins are spring loaded, the pins 12 automatically adjust to the contours of the workpiece 11 upon loading without the need for manual intervention or programming.

Once the mass of the workpiece 11 is loaded, the pins 12 can be vertically locked into position by selectively applying a magnetic field to the magnetorheological fluid, thereby maintaining secured contact with the workpiece 11 upon clamping with a matching pressure foot 50 (see FIGS. 3–7), which pressingly contacts the "other side" of the workpiece 11 against the magnetorheological clamp block 10.

By applying the magnetic field, the magnetorheological fluid locks the pin in place. The magnetorheological fluid generally consists of a suspension of small colloidal particles, each of which contains numerous randomly oriented magnetic domains. The externally applied magnetic field orients the magnetic particles domains and induces a large magnetic moment in each particle. Each particle then becomes a magnet whose strength is controlled by the applied field strength. These field-induced structures dramatically modify the viscosity of the magnetorheological fluid, turning the fluid suspension into a solid similar to plastic. This resulting effect in the change of viscosity effectively locks the pins 12 in place.

Optionally, the body 14 is gimbaled to permit a range of workpiece angular orientations relative to the fixture while still maintaining an approach direction approximately parallel to the direction of pin displacement.

In operation, a workpiece 11 to be assembled is first loaded onto the magnetorheological reconfigurable clamp 10. The mass of the workpiece 11 compresses and displaces the spring-loaded pins 12 such that most, if not all, pins are in contact with the workpiece. Because the pins are spring-loaded, the pins 12 collectively conform to the contours of the workpiece surface. Suitable workpieces 11 for loading onto the reconfigurable clamp are those that are sufficiently rigid so as not to flex or distort under the weight of the workpiece when supported by the clamp system. Once stabilized by the clamp, the electromagnet is energized such that a magnetic field is generated about the magnetorheological fluid. The applied magnetic field is preferably effective in increasing the (shear) yield stress of the magnetorheological fluid in the manner previously discussed. In one embodiment, the increase in (shear) yield stress is effective in preventing vertical motion of the pins so as to maintain each one of the pins in the vertical position at a height corresponding to the contour of the workpiece even when loaded by the clamping force applied through the pressure foot 50.

At the conclusion of the manufacturing cycle, the matching pressure foot is released and the workpiece is withdrawn. At this point, the electromagnet 30 is de-energized reducing the (shear) yield stress of the magnetorheological fluid to approximately zero. As such, the compression springs 22 will displace the pins 12 to the fully extended position so that the cycle can be repeated.

Figure 3:
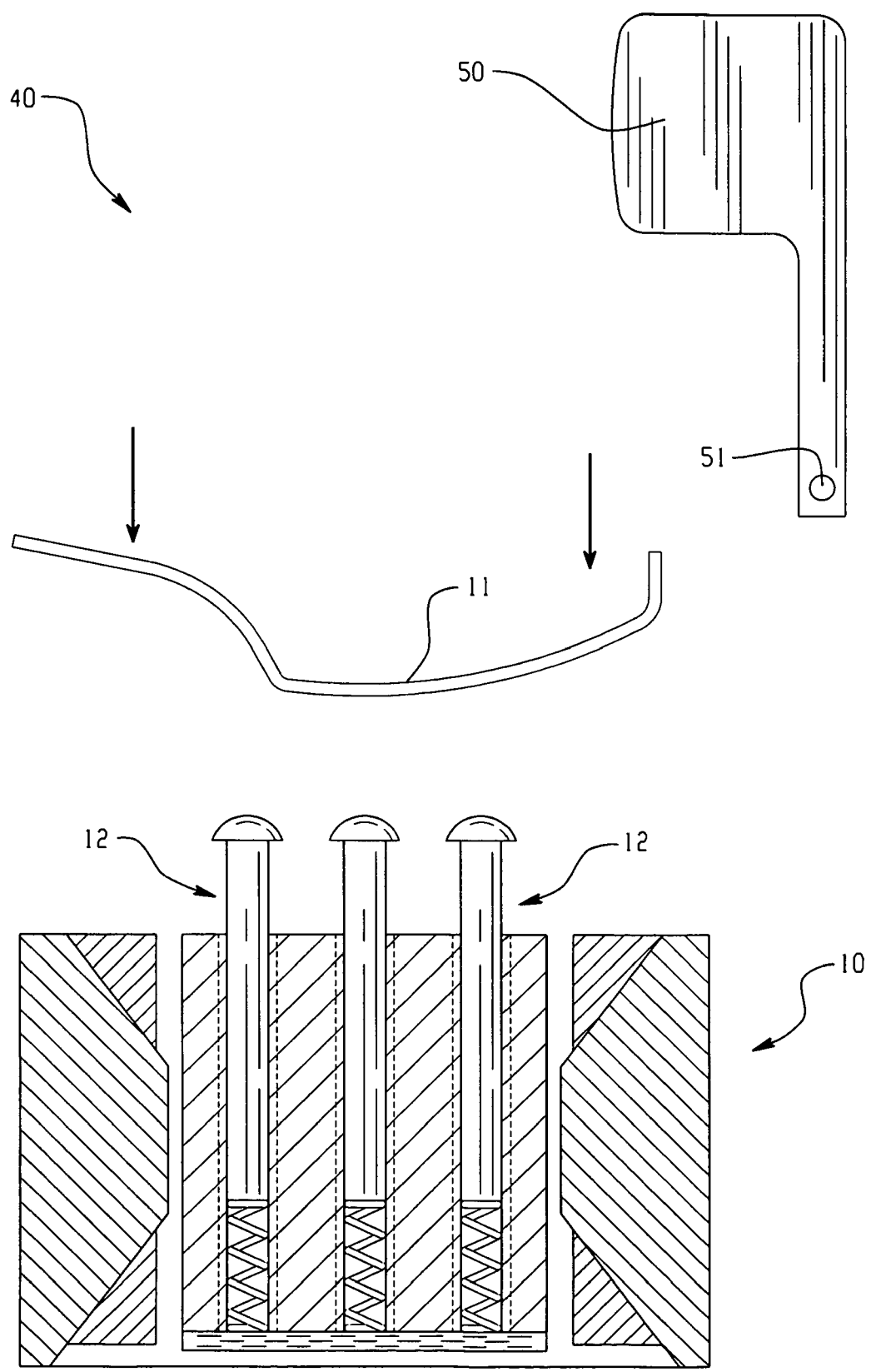
FIGS. 3–7 schematically illustrate a reconfigurable clamp system at various stages of a process sequence employing the magnetorheological reconfigurable clamp.

FIGS. 3–7 schematically illustrate a reconfigurable clamp system 40 at various stages of a process sequence employing the rotary and reconfigurable clamp. In FIG. 3, a workpiece 11, e.g., an automotive body panel, is shown being loaded in the direction indicated by arrows onto the reconfigurable clamp 10. A matching pressure foot 50, which pivots about pivot point 51 is in a retracted position to enable loading. Although reference is made to a pivotable matching pressure foot, any pressure foot is suitable for use with the reconfigurable clamp. The mass of the workpiece 11 compresses and displaces the spring-loaded pins 12 such that most, if not all, pins are in contact with the workpiece 11. Because the pins are spring-loaded, the pins collectively conform to the workpiece surface. Once the workpiece is stabilized, power is supplied to the electromagnet causing a marked increase in the (shear) yield stress of the magnetorheological fluid and thereby preventing movement of the pins in the vertical direction.

Figure 4:
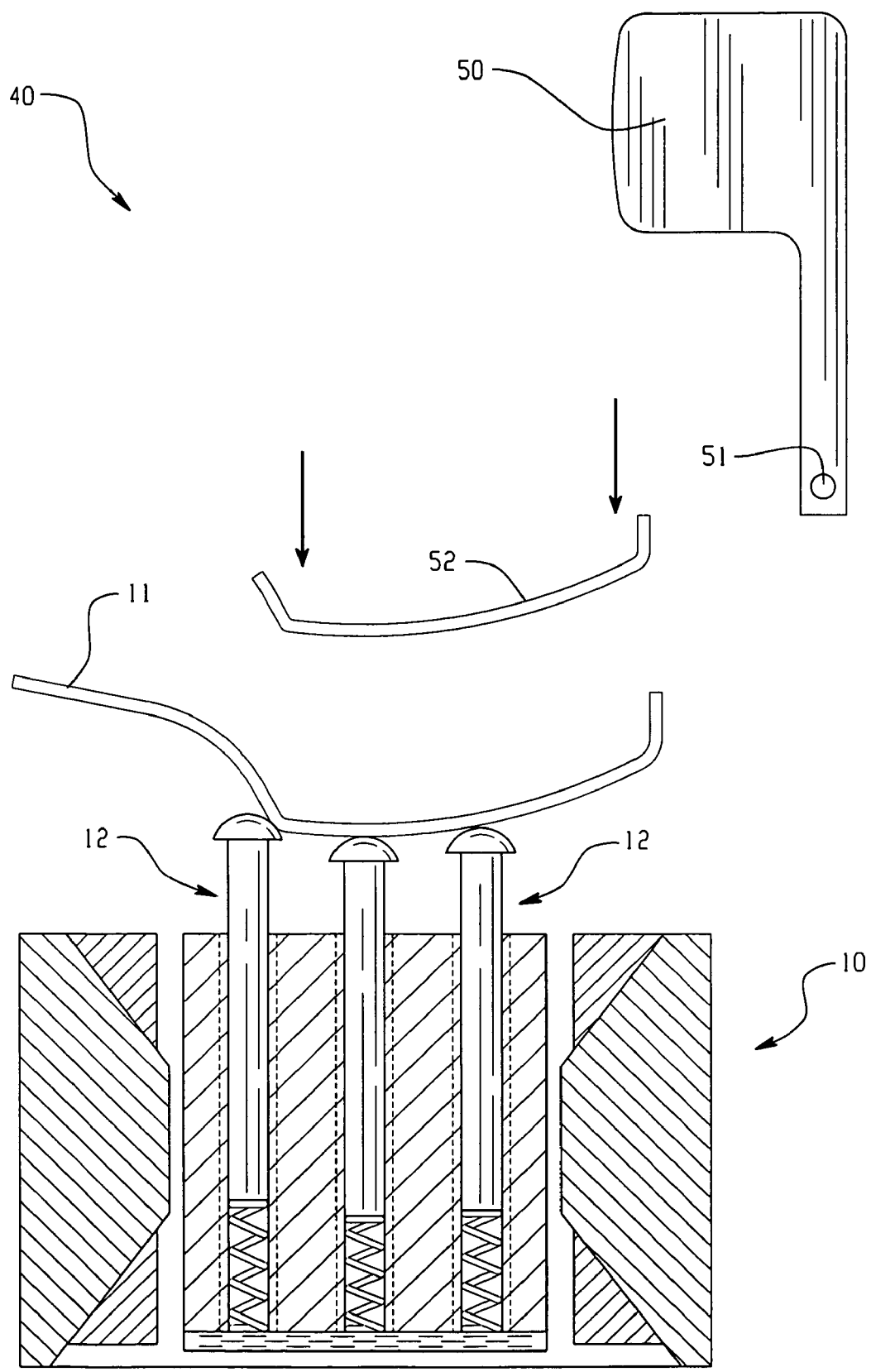

In FIG. 4, workpiece 11 is shown fully seated onto the clamp 10 causing the pins 12 therein to compress against the compression springs such that the pins conform to the part geometry. Once the workpiece 11 is loaded, the pins are locked in place by application of a suitable magnetic field to the magnetorheological fluid. The pressure foot 50 can remain in the retracted position to enable loading of a second workpiece 52, e.g., a reinforcement panel or the like. By way of example, the second workpiece 52 can be designed to self-locate by closely conforming to the matching contours of workpiece 11.

Figure 5:
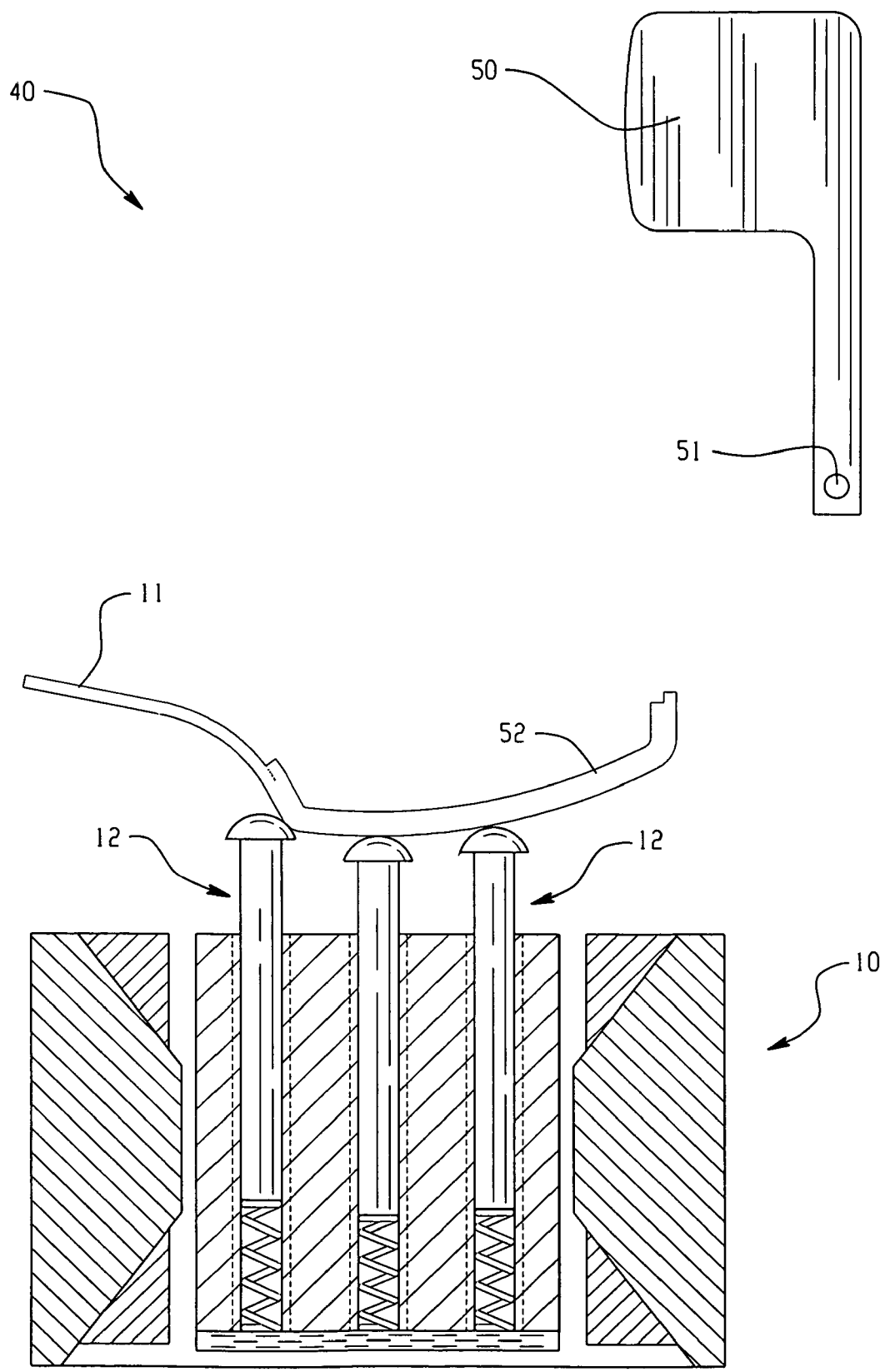

In FIG. 5, the second workpiece 52 is shown seated against workpiece 11.

Figure 6:
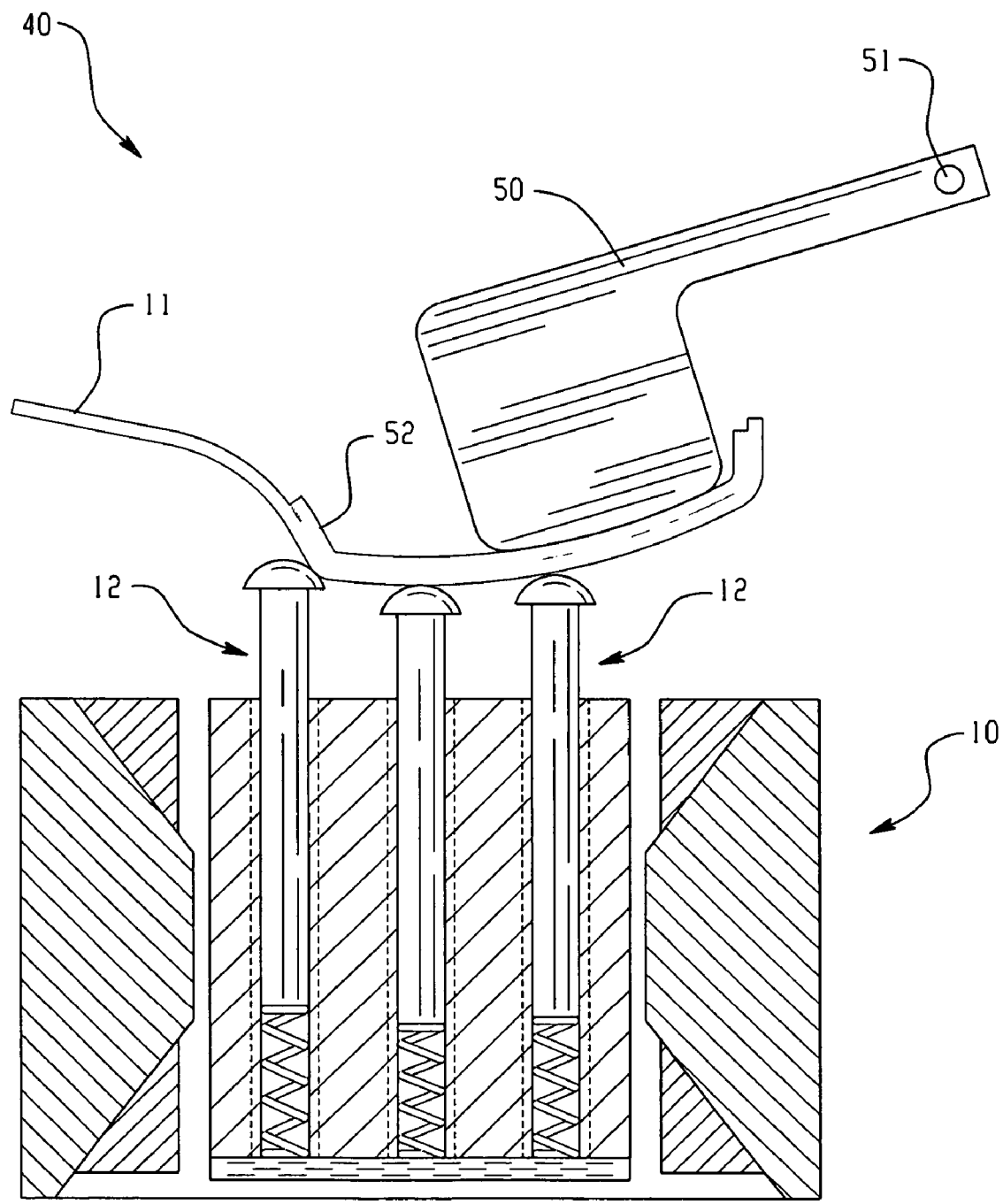

In FIG. 6, the matching pressure foot 50 pivots about the pivot point 51 to clamp workpiece 11 and the second workpiece 52 against the reconfigurable clamp 10. In one embodiment, the pressure foot 50 has a contact surface formed of a compliant material so as to deform upon contact with workpiece 11, thereby providing greater surface contact upon clamping.

Figure 7:
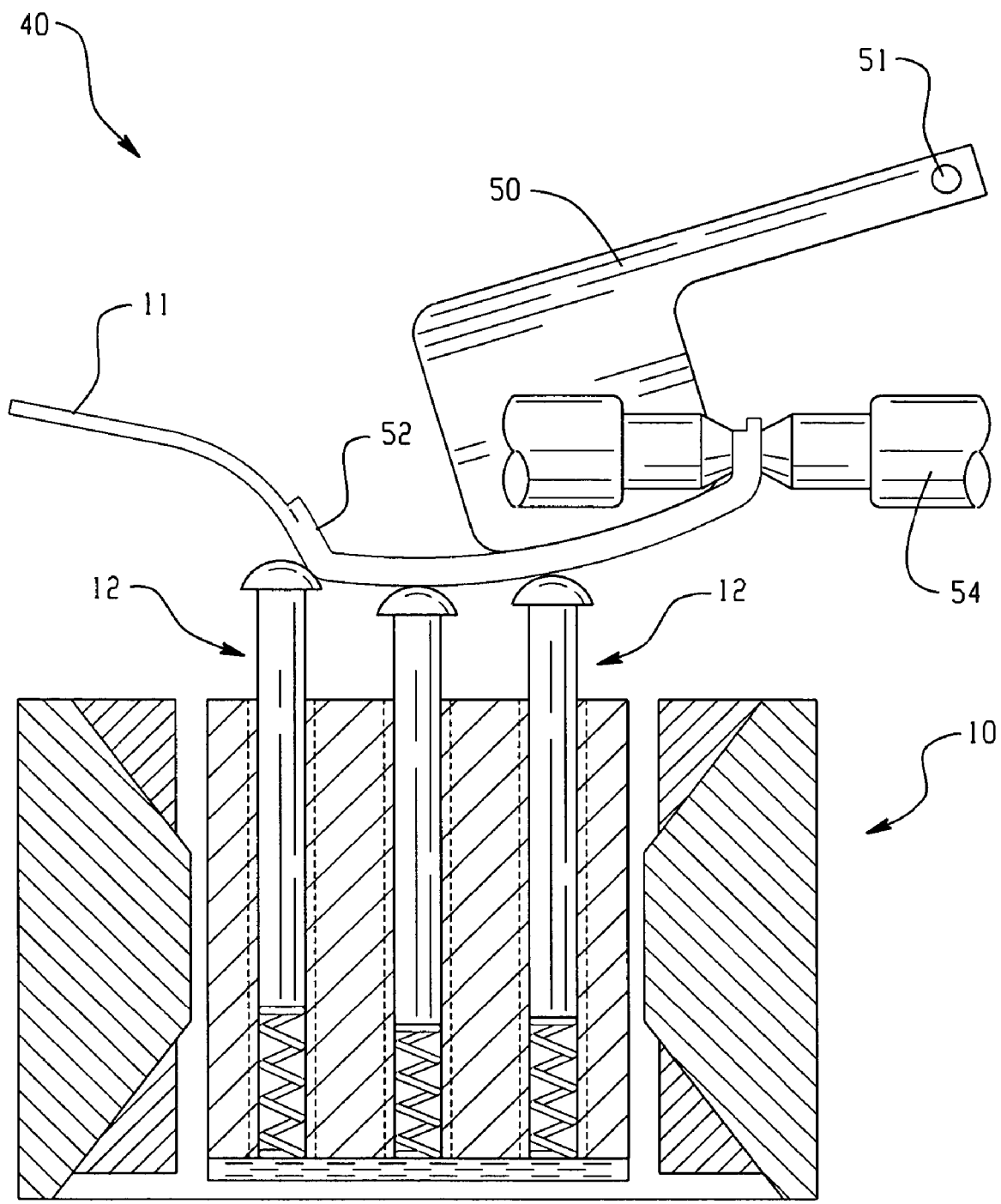

In FIG. 7, an optional pair of (resistance spot) welding electrode tips 54 attached to a welding gun (not shown) are moved into position to weld the second workpiece 52 to workpiece 11. For automotive body panel operations, the welds are preferably along a flange. The welding electrode tips 54 may be located along any part of the common flange length, where it does not interfere with the pressure foot 50 and clamp 10. At the conclusion of the weld(s), the welding electrode tips 54 are removed and the matching pressure foot 50 is pivoted to a retracted position. The assembled workpiece 11, 52 is then removed from the fixture and advanced to the next station.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A reconfigurable clamp, comprising:
   a body comprising a plurality of sleeves and a reservoir in fluid communication with the plurality of sleeves;
   a plurality of pins, wherein each one of the plurality of pins is disposed in sliding engagement with a corresponding one of the plurality of sleeves, wherein each one of the plurality of pins comprises a head, a shaft extending from the head, and a compression spring in operative communication with the shaft;
   a magnetorheological fluid disposed in the reservoir and the plurality of sleeves; and
   an electromagnet in operative communication with the magnetorheological fluid.

2. The reconfigurable clamp of claim 1, further comprising a stop in operative communication with each one of the plurality of pins and the plurality of sleeves.

3. The reconfigurable clamp of claim 2, wherein the stop comprises a protrusion extending from each one of the plurality of pins and a recess disposed in a sidewall of the corresponding one of the plurality of sleeves.

4. The reconfigurable clamp of claim 1, wherein the magnetorheological fluid comprises ferromagnetic or paramagnetic particles or particulates dispersed in a carrier fluid.

5. The reconfigurable clamp of claim 4, wherein the particles or the particulates are in an amount of about 5 to about 75 percent by volume of the magnetorheological fluid.

6. The reconfigurable clamp of claim 1, wherein the body has at least one gimbaled surface.

7. The reconfigurable clamp of claim 1, wherein each one of the plurality of pins further comprises a seal in sealing communication with the shaft and the corresponding one of the plurality of sleeves.

8. The reconfigurable clamp of claim 1, wherein the magnetorheological fluid is disposed in a bladder.

9. A reconfigurable clamp system, comprising:
   a clamp comprising a body portion, a plurality of pins slidably engaged within sleeves formed in the body portion, a compression spring attached to each shaft of the plurality of pins, a reservoir comprising a magnetorheological fluid in operative communication with the plurality of pins, and an electromagnet in operative communication with the magnetorheological fluid, wherein the electromagnet selectively increases a yield stress property of the magnetorheological fluid; and
   a matching pressure foot.

10. The reconfigurable clamp system of claim 9, further comprising a stop in operative communication with each one of the plurality of pins and sleeves.

11. The reconfigurable clamp system of claim 10, wherein the stop comprises a protrusion extending from each one of the plurality of pins and a recess portion disposed in a sidewall of the sleeves.

12. The reconfigurable clamp system of claim 9, wherein the magnetorheological fluid comprises ferromagnetic or paramagnetic particles or particulates dispersed in a carrier fluid.

13. The reconfigurable clamp system of claim 12, wherein the particles are in an amount of about 5 to about 75 percent by volume of the magnetorheological fluid.

14. The reconfigurable clamp system of claim 9, wherein the body portion has at least one gimbaled surface.

15. The reconfigurable clamp system of claim 9, wherein each one of the plurality of pins further comprises a seal in sealing communication with the shaft and the sleeves.

16. The reconfigurable clamp system of claim 9, wherein the magnetorheological fluid is disposed in a bladder.

17. A process for clamping a workpiece, the process comprising:
   loading a first workpiece onto a reconfigurable clamp, wherein the reconfigurable clamp comprises a clamp comprising a body portion, a plurality of pins slidably engaged within sleeves formed in the body portion, a compression spring attached to each shaft of the plurality of pins, a reservoir comprising a magnetorheological fluid in operative communication with the plurality of pins, and an electromagnet in operative communication with the magnetorheological fluid, wherein the electromagnet selectively increases a yield stress property of the magnetorheological fluid;

compressing the plurality of pins to conform substantially to a surface contour of the first workpiece;

applying a magnetic field with the electromagnet to the magnetorheological fluid to alter a shear force of a sliding engagement between the plurality of pins and the sleeves; and applying a member to a backside of the first workpiece.

18. The process of claim 17, wherein applying the magnetic field comprises changing a current to a coil in proximity to the magnetorheological fluid.

19. The process of claim 17, further comprising discontinuing the magnetic field; removing the member; and removing the first workpiece from the reconfigurable clamp.

20. The process of claim 17, further comprising loading a second workpiece onto the reconfigurable clamp, wherein the second workpiece has a different surface contour than the first workpiece; compressing the plurality of pins to conform substantially to a surface contour of the second workpiece; applying a magnetic field with the electromagnet to the magnetorheological fluid to alter the shear force of the sliding engagement between the plurality of pins and the sleeves; and applying a member to a backside of the surface of the second.

* * * * *